United States Patent [19] [11] Patent Number: 4,569,013
Kishi et al. [45] Date of Patent: Feb. 4, 1986

[54] SPINDLE SPEED CONTROL METHOD AND APPARATUS

[75] Inventors: Hajimu Kishi, Hino; Kunio Tanaka; Takashi Takegahara, both of Hachioji, all of Japan

[73] Assignee: Fanuc Limited, Minamitsuru, Japan

[21] Appl. No.: 507,493

[22] Filed: Jun. 24, 1983

[30] Foreign Application Priority Data

Jun. 24, 1982 [JP] Japan ................. 57-108867

[51] Int. Cl.⁴ ............................................. G05B 13/02
[52] U.S. Cl. .................................... 364/174; 364/474; 318/571; 318/12; 408/1.1
[58] Field of Search .................. 364/174, 474, 424.1; 318/571, 11, 12, 13, 14; 408/11; 82/2 B; 74/866, 752 D, 752 A

[56] References Cited

U.S. PATENT DOCUMENTS

| 3,634,664 | 1/1972 | Valek | 318/571 |
|---|---|---|---|
| 3,665,493 | 5/1972 | Glowzewski et al. | 318/571 |
| 3,865,209 | 2/1975 | Aihara et al. | 318/12 |
| 3,943,799 | 3/1976 | Sakai et al. | 74/866 |
| 3,976,861 | 8/1976 | Edwards et al. | 318/571 |
| 4,039,061 | 8/1977 | Pruvot et al. | 364/426 |
| 4,096,418 | 6/1978 | Marumoto et al. | 318/12 |
| 4,148,231 | 4/1979 | Redzinski | 74/866 |
| 4,314,340 | 2/1982 | Miki et al. | 364/424.1 |
| 4,324,153 | 4/1982 | Sugimoto et al. | 74/866 |
| 4,338,832 | 7/1982 | Pelligrino | 364/424.1 |
| 4,463,427 | 7/1984 | Bonnetain et al. | 364/424.1 |

FOREIGN PATENT DOCUMENTS 0010935 5/1980 European Pat. Off. .

OTHER PUBLICATIONS

European Search Report, Application No. EP 83 30 3616.

Primary Examiner—Jerry Smith
Assistant Examiner—John R. Lastova
Attorney, Agent, or Firm—Staas & Halsey

[57] ABSTRACT

A method and an apparatus for controlling spindle speed are disclosed. When the speed ranges of respective gear ranges are selected in advance so that speed ranges corresponding to neighboring gear ranges partially overlap one another, and the gear range conforming to the commanded spindle speed is selected for rotating the spindle at the commanded spindle speed, it is determined whether the commanded spindle speed belongs to the currently selected range, no gear change is made if the decision is affirmative, and the gear range to which the newly commanded spindle speed belongs is found if the decision is negative, the gear range being switched to the gear range thus found.

4 Claims, 3 Drawing Figures

SPINDLE SPEED CONTROL METHOD AND APPARATUS

BACKGROUND OF THE INVENTION

This invention relates to a spindle speed control method and apparatus and more particularly to such a method and apparatus in which the speed ranges for respective gear ranges are selected in advance so that the speed ranges corresponding to neighboring gear ranges partially overlap one another, and in which the gear ranges conforming to a newly commanded spindle speed are selected for rotating the spindle with gears of the thus selected gear range.

In NC machine tools, the spindle speed is commanded by an S-function instruction from a numerical control device. The spindle speed is required to have a wide speed range. Gear means are used in a known manner so that this wide speed range is covered by a single electric motor. The desired gears are selected in advance by an M-function instruction in accordance with the commanded spindle speed so that the spindle is rotated at the commanded spindle speed.

In FIG. 1, the relation between the spindle speed ranges and the gear ranges is shown. The first range covers the speed range between 500 and 1500 rpm, the second range covers the speed range between 1000 and 3000 rpm, and the third range covers the speed range between 2000 and 5000 rpm. The speed range of neighboring ranges partially overlap one another.

When the speed ranges of neighboring gear ranges partially overlap one another in this manner, care must be taken or the number of times the range is switched will increase unnecessarily, thus affecting the machining time and thereby efficiency. This is because the machine tool operates to change the spindle speed upon receiving the S-function instruction (spindle speed instruction) from the NC device and sends an S-function completion signal to the NC device, whereby the NC device proceeds to the next NC command. Thus, an increase in the number of times the range is switched may prolong the time for switching the spindle speed and, hence, prolong the machining time. It is therefore necessary to minimize the number of times range switching is performed. However, the conventional system involves switching range a large number of times. For example, when the spindle is rotating at 1800 rpm, which is included in the second range, and a commanded spindle speed is 1300 rpm, included in the overlapping range of the first and second ranges, a gear change is made. The reason for this is that the gear range to which the commanded spindle speed belongs is decided by starting the selection from the lower range. Thus, whether the commanded spindle speed belongs to the first, second or third range is decided in this order and is based on a negative decision regarding the respective preceding ranges. Thus, when the spindle is rotating at 3100 rpm which is included in the third range, and the commanded spindle speed is 2950 rpm which is included in the range overlapping the second and third ranges, the gear range is switched from the third range to the second range. In actuality, however, gear changes are not required for speed changes from 1800 rpm to 1300 rpm or from 3100 rpm to 2950 rpm.

SUMMARY OF THE INVENTION

It is an object of the present invention to provide a method and apparatus for controlling spindle speed, according to which the necessity of making a gear change in the foregoing cases is minimized.

It is another object of the present invention to provide a method and apparatus for controlling spindle speed, in which a gear change is not made in a case where the spindle speed is changed but the commanded spindle speed is included within the current gear range, for reducing the time necessary in switching the spindle speed.

According to the present invention, in instances where the speed ranges of the respective gear ranges are selected in advance, and the gears of the gear ranges conforming to the commanded spindle speed are selected for rotating the spindle at the commanded spindle speed, the gear range of the currently selected gears is stored in a memory. It is then decided to which of the gear ranges in newly commanded spindle speed belongs, and whether the commanded spindle speed belongs to the speed range of the stored gear range. If the commanded spindle speed has been decided as belonging to the speed range of the stored gear range, the spindle speed is controlled without making any gear change. If otherwise, the gear range to which the newly commanded speed belongs is found and the gear range is switched to the gear range thus found.

DESCRIPTION OF PREFERRED EMBODIMENTS

Figure 1:
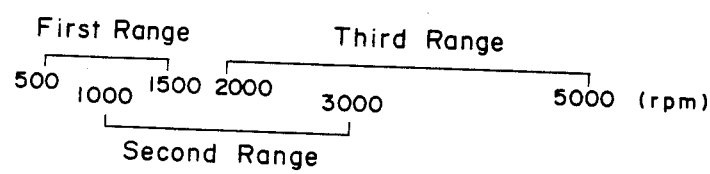
FIG. 1 is a diagram of the relationship between the gear ranges and speed ranges.
Figure 2:
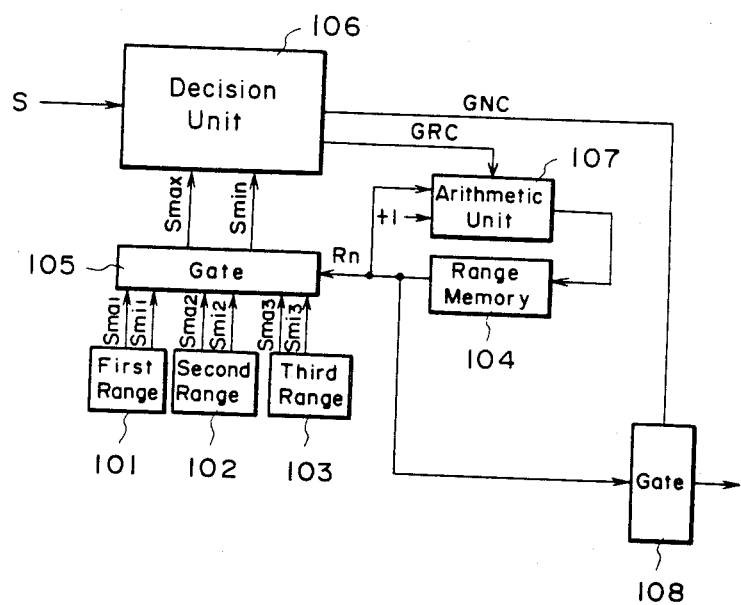
FIG. 2 is a block diagram of a preferred embodiment of the present invention.

FIG. 2 is a block diagram showing a preferred embodiment of the present invention. A minimum speed Smi1 and a maximum speed Sma1 for the first range are stored in a first range memory 101, while a minimum speed Smi2 and a maximum speed Sma2 for the second range are stored in a second range memory 102. Similarly, a minimum speed Smi3 and a maximum speed Sma3 are stored in a third range memory 103. A current speed range indicated, and thus the first, second or third speed range indicator, is stored in a range memory 104 comprising a ternary register or three state register. Thus, when the data stored in the range memory 104 is "01", "10", or "11", the first, second or third ranges, respectively, are stored in the memory 104, respectively. When a new spindle speed S is commanded, the minimum and maximum speeds Smin and Smax for the current range based on the indicator stored in the range memory 104 are delivered to a decision unit 106. Using Smax, Smin and the commanded spindle speed S, the unit 106 decides whether the equation $$Smin \leq S \leq Smax \qquad (1)$$

is true. If the equation (1) is true, a signal GNC, indicating that a gear change is not required, is delivered by the decision unit 106. In response to the signal GNC, the range Rn stored in the range memory 104 is delivered through a gate 108 to a gear change control unit, not shown. Thus, no gear change is made.

If equation (1) is not true, a gear range change signal GRC is delivered from the decision unit 106. Upon receiving the gear range change signal GRC, an arithmetic unit 107 adds +1 to the current range indicator Rn stored in the range memory 104, in other words, it performs an operation $$Rn+1 \rightarrow Rn \qquad (2)$$

and the result of the operation is stored in the range memory 104. The gate 105 is now in a position to supply the decision unit 106 with the minimum and maximum speeds for the new speed range indicator stored in the range memory 104. From this time on, the speed range to which the commanded spindle speed S belongs is delivered ultimately through gate 108 by a sequence of operations similar to those described above. It should be noted that the minimum and maximum speeds enter the decision unit 106 in the order of the first, second and third ranges, the second, third and first ranges, or the third, first and second ranges, depending on whether the current range is the first, second or third range, respectively.

Figure 3:
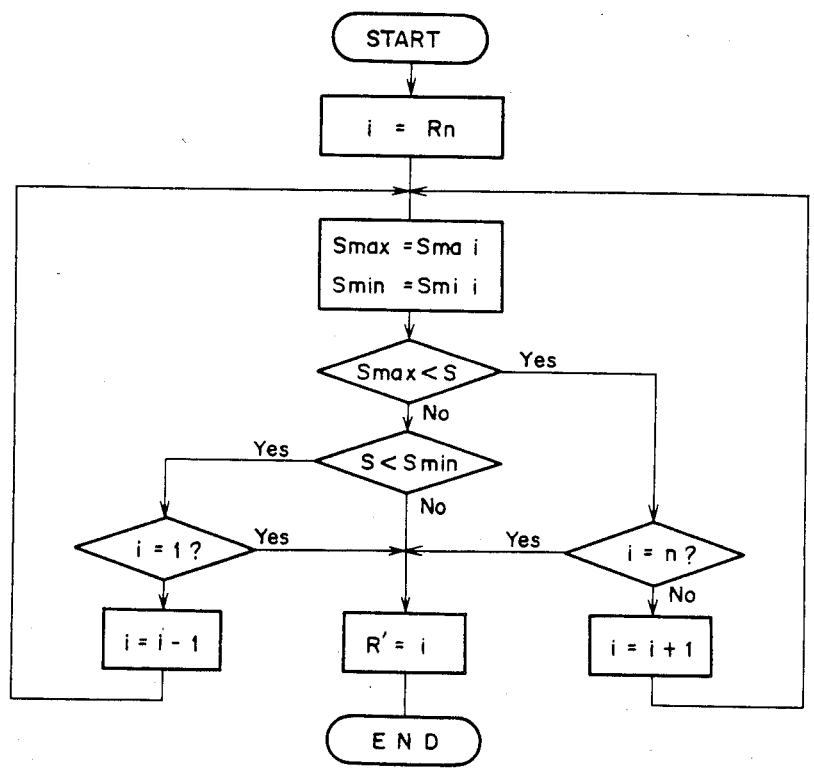
FIG. 3 is a flow chart of spindle speed control according to the present invention.
Figure 3:
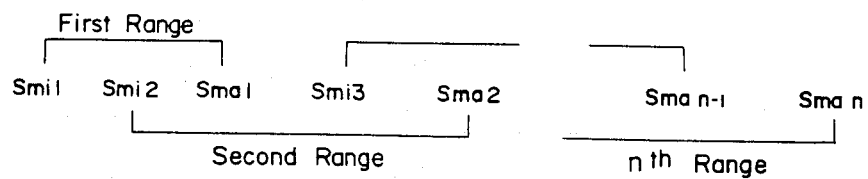

FIG. 3 shows a flow chart indicating the sequence for controlling spindle speed according to the present invention. First, the currently selected gear range Rn is stored. Then, the maximum speed Smai and the minimum speed Smii of the ith range, that is, the gear range to which the currently commanded spindle speed belongs, are stored. When a new spindle speed S is commanded, it is determined whether the new spindle speed S belongs to the current stored gear range Rn. If affirmative, that is, if the new spindle speed S is not larger than the maximum speed Smax of the range Rn and not smaller than the minimum speed Smin of said range, the spindle speed is controlled within the current range without making a gear change. If negative, and if the new spindle speed S is larger than the maximum speed Smax of the above-mentioned range Rn, then the gear change is made to Rn+1 and, thus, to a range of an order higher than the range Rn. If the spindle speed S is less than the minimum speed Smin of the above-mentioned range Rn, the gear change is made to Rn−1 and, thus, to a range of an order lower than the range Rn. In the drawing, n designates the range number, R' the range to be selected next, Smin the minimum speed of the nth range and Sman the maximum speed of the nth range.

From the foregoing it can be seen that, when the spindle speed is changed, it is decided first all whether the commanded spindle speed belongs to the current range and, if affirmative, no gear change is made. Hence, contrary to the prior-art system, a gear change is not executed when the spindle speed has changed from 1800 to 1300 rpm or from 3100 to 2950 rpm, and it is sufficient to only change the speed within the current range, that is, within the second or third range, respectively, thus making it possible to reduce the time required in switching the spindle speed.

The present system is of the type in which the signal GNC is supplied when it is not necessary to make a gear change. However, the present system may be applied to a case in which the gear change signal is supplied only when the gear change is required.

What we claim is:

1. A method of controlling spindle speed for selecting speed ranges of respective gear ranges so that speed ranges corresponding to neighboring gear ranges partially overlap one another such that the spindle can be rotated within substantial portions of each overlapping range, and selecting the gear range conforming to a commanded spindle speed for rotating a spindle at the commanded spindle speed, said commanded spindle speed capable of falling within overlapping gear ranges, said method comprising the steps of:
   (a) storing a currently selected gear range;
   (b) deciding whether a commanded spindle speed falls within the speed range of the stored currently selected gear range, when said commanded spindle speed is delivered;
   (c) controlling the spindle speed without making a gear change when the commanded spindle speed is found to fall within the speed range of the stored currently selected gear range as a result of the decision in step (b) even when the commanded spindle speed also falls within a gear range overlapping the current gear range; and
   (d) finding a correct gear range to which the commanded spindle speed belongs and switching to said correct gear range when the commanded spindle speed is found not to fall within the speed range of the stored currently selected gear range as a result of the decision in step (b).

2. A method as claimed in claim 1, wherein said step (d) comprises selecting a gear range of an order higher than said stored currently selected gear range when the newly commanded spindle speed is larger than a maximum speed of said stored currently selected gear range.

3. A method as claimed in claim 1, wherein said step (d) comprises selecting a gear range of an order lower than said stored currently selected gear range when the newly commanded spindle speed is lower than a minimum speed of said stored currently selected gear range.

4. An apparatus for controlling a spindle speed in which speed ranges of respective gear ranges are determined in advance so that the speed ranges of neighboring gear ranges partially overlap one another such that the spindle can be rotated within substantial portions of each overlapping range and in which a gear range conforming to a commanded spindle speed is selected for rotating the spindle at the commanded spindle speed, said commanded spindle speed capable of falling within overlapping gear ranges, said apparatus comprising:
   memory means for storing minimum and maximum speeds of the respective speed ranges;
   range memory means for storing a current gear range;
   gate means, operatively connected to said range memory means and said memory means, responsive to the commanded spindle speed and for delivering the minimum and maximum speeds associated with the current gear range stored in said range memory means;
   decision means, responsive to the output from said gate means, for deciding whether the commanded spindle speed is included in the current gear range defined by said minimum and maximum speeds output by said gate means, based on said minimum and maximum speeds and said commanded spindle speed;
   means, operatively connected to said decision means, for delivering a signal indicating that a gear change is not required when the commanded spindle speed falls within said current gear range as a result of the decision by said decision means even when the commanded spindle speed also falls within a gear range overlapping the current gear range; and gear change control means, operatively connected to said decision means and said range memory means, for determining a gear range to which said commanded spindle speed belongs, when the commanded spindle speed does not fall within said current gear range as a result of a decision in said decision means, and switching to the gear range thus found.

* * * * *

UNITED STATES PATENT AND TRADEMARK OFFICE
CERTIFICATE OF CORRECTION

PATENT NO. : 4,569,013

DATED : February 4, 1986

INVENTOR(S) : HAJIMU KISHI ET AL.

It is certified that error appears in the above-identified patent and that said Letters Patent is hereby corrected as shown below:

Col. 1, line 7, delete "such".

Col. 2, line 17, change "in" to --the--.

*Signed and Sealed this*

*Twenty-fourth* Day of *June 1986*

[SEAL]

*Attest:*

DONALD J. QUIGG

*Attesting Officer*  *Commissioner of Patents and Trademarks*